(12) United States Patent
Yang

(10) Patent No.: US 11,872,741 B2
(45) Date of Patent: Jan. 16, 2024

(54) WIRING TROUGH AND PREPARATION METHOD THEREOF

(71) Applicant: Foshan YouZhiJiaMei Plastic Products Co., Ltd., Guangdong (CN)

(72) Inventor: Mingkun Yang, Foshan (CN)

(73) Assignee: Foshan YouZhiJiaMei Plastic Products Co., Ltd.

( * ) Notice: Subject to any disclaimer, the term of this patent is extended or adjusted under 35 U.S.C. 154(b) by 348 days.

(21) Appl. No.: 17/316,638

(22) Filed: May 10, 2021

(65) Prior Publication Data
US 2022/0339839 A1   Oct. 27, 2022

(30) Foreign Application Priority Data

Apr. 21, 2021   (CN) .......................... 202110427921.6

(51) Int. Cl.
| | |
|---|---|
| *H02G 3/04* | (2006.01) |
| *B29C 48/17* | (2019.01) |
| *B29C 48/00* | (2019.01) |
| *B29C 48/09* | (2019.01) |
| *B29C 48/12* | (2019.01) |
| *B29C 48/40* | (2019.01) |
| *B29K 27/06* | (2006.01) |
| *B29K 105/00* | (2006.01) |

(52) U.S. Cl.
CPC ........ *B29C 48/175* (2019.02); *B29C 48/0022* (2019.02); *B29C 48/09* (2019.02); *B29C 48/12* (2019.02); *H02G 3/0418* (2013.01); *H02G 3/0437* (2013.01); *B29C 48/40* (2019.02); *B29K 2027/06* (2013.01); *B29K 2105/0026* (2013.01); *B29K 2105/0044* (2013.01)

(58) Field of Classification Search
None
See application file for complete search history.

(56) References Cited

U.S. PATENT DOCUMENTS 8,779,290 B1 *   7/2014   DePaul ................ H02G 3/0431
174/68.3

\* cited by examiner

*Primary Examiner* — Krystal Robinson

(57) ABSTRACT

A wiring trough, comprising a trough body, and a trough cover arranged on the trough body, wherein the two ends of the trough body are respectively provided with a first clamping portion, and the two ends of the trough cover are respectively provided with a second clamping portion, wherein the trough body and the trough cover are connected in a mutual clamping manner through the first clamping portion and the second clamping portion, wherein a channel for receiving a wire is formed by the trough body and the trough cover, wherein a first decoration lug is arranged on each of the first clamping portion, and a second decoration lug is arranged on each of the second clamping portion.

8 Claims, 3 Drawing Sheets

WIRING TROUGH AND PREPARATION METHOD THEREOF

TECHNICAL FIELD

This invention generally relates to the technical field of preparing wiring troughs, and more particularly, to a wiring trough and a preparation method thereof.

BACKGROUND

A PVC wiring trough (i.e., a polyvinyl chloride wiring trough) is generally referred to as a wiring case, an electrical wiring pipe or a wiring duct, etc. Based on the difference in construction material, wiring troughs sold on the market consists of various types, among which the eco-friendly flame-retardant PVC wiring troughs, halogen-free PPO wiring troughs, halogen-free PC/ABS wiring troughs and steel-aluminum wiring troughs are the most common wiring troughs. The shortcomings of the conventional PVC wiring trough include lack of functionality, poor flame retardancy, low hardness and complex production process. Moreover, they often not aesthetically appealing and practical. Therefore, it is necessary for those skilled in the art to develop a novel wiring trough and a preparation method thereof.

SUMMARY

The purpose of the present invention is to provide a wiring trough and a preparation method thereof.

To achieve the above purpose, the present invention adopts the following technical solution: a wiring trough comprising a trough body 1 and a trough cover arranged on the trough body, wherein the two ends of the trough body are respectively provided with a first clamping portion, and the two ends of the trough cover are respectively provided with a second clamping portion, wherein the trough body and the trough cover are connected in a mutual clamping manner through the first clamping portion and the second clamping portion, wherein a channel for receiving a wire is arranged in the middle of the trough body and the trough cover, wherein a first decoration lug is arranged on one side of the first clamping portion, and a second decoration lug is arranged on one side of the second clamping portion.

In another preferred embodiment, the cross section of the trough cover is in an arc shape or a wave shape. The trough body and the trough cover are made of PVC plastic.

A method for preparing the wiring trough, comprising the steps of:
  Step 1: selecting raw materials: weigh 99 parts of PVC resin, 3 parts of a combined heat stabilizer, 4 parts of an anti-impact agent, 2 parts of a lubricant and 4 parts of a flame retardant, and then feeding them into a mixing mechanism to produce a mixture;
  Step 2: feeding the mixture obtained in step 1 into a heating device for heating, wherein the heating temperature is 110° C.-120° C., then cooling and letting it sit for 24 hours;
  Step 3: feeding the processed mixture obtained in step 2 into two twin-screw extruders for extrusion, plasticizing and molding, thereby enhancing the wood feeling of the wiring trough and achieving the multi-color of the wiring trough; finally, automatically cutting to obtain finished wiring troughs.

In another preferred embodiment, in step 3, the extrusion temperature of the twin-screw extruder is 150° C.-180° C.

In another preferred embodiment, in step 1, the flame retardant is a magnesium hydroxide halogen-free flame retardant.

In another preferred embodiment, in step 1, the lubricant is composed of stearic acid, oxidized polyethylene wax and stearic acid glyceride in a mass ratio of 1:1:2.

In another preferred embodiment, in step 1, the combined heat stabilizer is formed by mixing calcium stearate, zinc stearate and ultraviolet absorber according to a mass ratio of 1:1:3.

In another preferred embodiment, in step 1, the anti-impact agent is composed of methyl methacrylate and acrylate in a mass ratio of 1:1.

Compared with the prior art, the present invention has the following advantages: the wiring trough of the present invention has high flame retardancy and is eco-friendly. The prepared wiring trough not only is able to accommodate and protect wires, but can also serve as decoration or corner trim.

In the Figures:
  1—Trough Body, 2—Trough Cover, 3—The First Clamping Portion, 4—The Second Clamping Portion, 5—The Second Decoration Lug, 6—The First Decoration Lug.

DETAILED DESCRIPTION

To make the technical means, features, purposes and effects of the present invention easy to understand, detailed embodiments are combined hereinafter to further elaborate the techniques of the present invention.

Figure 1:
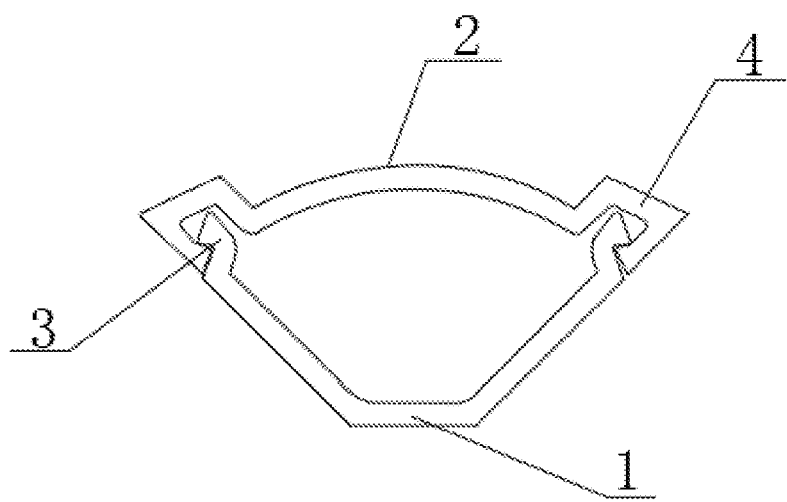
FIG. 1 is a conceptual diagram illustrating a side view of the wiring trough of the present invention.
Figure 2:
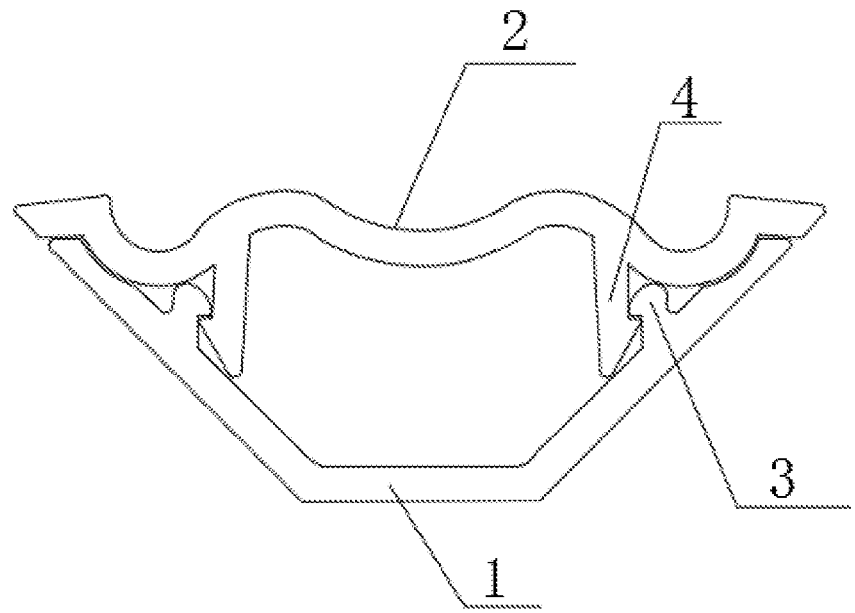
FIG. 2 is a conceptual diagram illustrating a side view of the wave-shaped trough cover of the present invention.
Figure 3:
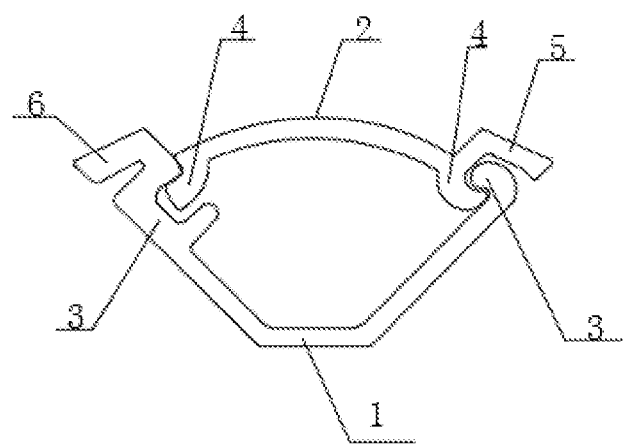
FIG. 3 is a conceptual diagram illustrating a side view of the arc-shaped trough cover with decoration lugs of the present invention.
Figure 4:
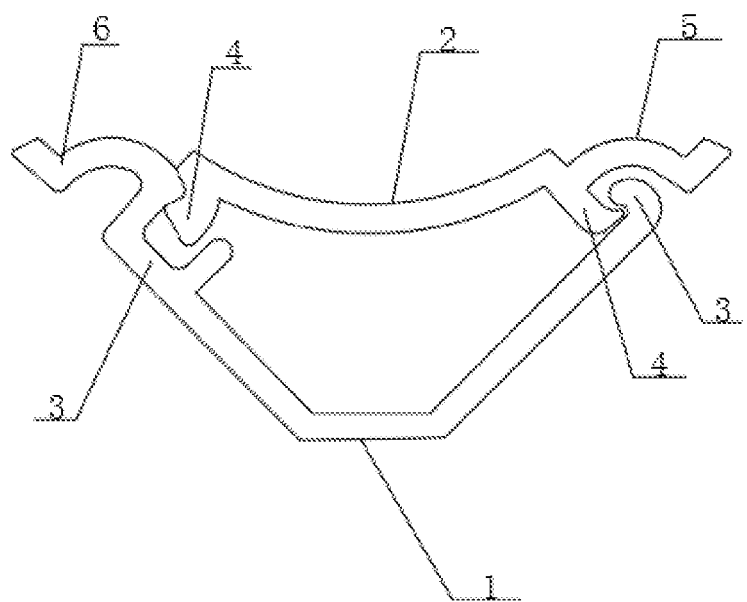
FIG. 4 is another conceptual diagram illustrating a side view of the arc-shaped trough cover with decoration lugs of the present invention.

As shown in FIGS. 1-4, the wiring trough of the present invention comprises a trough body 1 and a trough cover 2 arranged on the trough body 1, wherein the two ends of the trough body 1 are respectively provided with a first clamping portion, and the two ends of the trough cover 2 are respectively provided with a second clamping portion 4. The trough body 1 and the trough cover 2 are connected in a mutual clamping manner through the first clamping portion 3 and the second clamping portion 4. A channel for receiving a wire is form in the middle of the trough body 1 and the trough cover 2. A first decoration lug 6 is arranged on one side of the first clamping portion 3, and a second decoration lug 5 is arranged on one side of the second clamping portion 4.

The cross section of the trough cover 2 is in an arc shape or a wave shape. The trough body 1 and the trough cover 2 are made of PVC plastic.

A method for preparing the wiring trough, comprising the steps of:
  Step 1: selecting raw materials: weigh 99 parts of PVC resin, 3 parts of a combined heat stabilizer, 4 parts of an anti-impact agent, 2 parts of a lubricant and 4 parts of a flame retardant, and then feeding them into a mixing mechanism to obtain a mixture;

Step 2: feeding the mixture obtained in step 1 into a heating device for heating, wherein the heating temperature is 110° C.-120° C., then cooling and letting it sit for 24 hours;

Step 3: feeding the mixture processed in step 2 into two twin-screw extruders for extrusion, plasticizing and molding, thereby enhancing the wood feeling of the wiring trough and achieving the multi-color of the wiring trough; finally, automatically cutting to obtain finished wiring troughs.

In step 3, the extrusion temperature of the twin-screw extruder is 150° C.-180° C.

In step 1, the flame retardant is a magnesium hydroxide halogen-free flame retardant.

In step 1, the lubricant is composed of stearic acid, oxidized polyethylene wax and stearic acid glyceride in a mass ratio of 1:1:2.

In step 1, the combined heat stabilizer is formed by mixing calcium stearate, zinc stearate and ultraviolet absorber according to a mass ratio of 1:1:3.

In step 1, the anti-impact agent is composed of methyl methacrylate and acrylate in a mass ratio of 1:1.

After being tested, the qualified product is packaged for sale.

The basic principle, main features and benefits of the present invention are described above. Those skilled in the art should understand that the present invention is not limited by the embodiments disclosed. Various modifications and improvements may be made without departing from the spirit and scope of the present invention, and thus all of which shall fall into the scope of the present invention. The scope of the present invention is defined by the claims and their equivalents.

What is claimed is:

1. A wiring trough, comprising:
    a trough body (1), and
    a trough cover (2) arranged on the trough body (1), wherein the two ends of the trough body (1) are respectively provided with a first clamping portion, and the two ends of the trough cover (2) are respectively provided with a first clamping portion and a second clamping portion, wherein two ends of the trough covers are respectively provided with a first clamping portion and a second clamping portion, wherein a notch is formed in each of the second clamping portions, wherein a protrusion is formed in an end of each of the first clamping portions, wherein the protrusion of the first clamping portion of the trough body is capable of engaging the notch of the second clamping portion of the trough cover, and the notch of the first clamping body of the trough body is capable of engaging the notch of the second clamping portion of the trough cover, wherein a channel for receiving a wire is formed by the trough body (1) and the trough cover (2), wherein a first decoration lug (6) is arranged on an end of the second clamping portion of the trough body, and a second decoration lug (5) is arranged on an end of the second clamping portion of the trough cover.

2. The wiring trough of claim 1, wherein the cross section of the trough cover (2) is in an arc shape or a wave shape, wherein the trough body 1 and the trough cover (2) are made of PVC plastic.

3. A method for preparing the wiring trough of claim 1, comprising:
    Step 1: obtaining a mixture of raw material by placing 99 parts of PVC resin, 3 parts of a combined heat stabilizer, 4 parts of an anti-impact agent, 2 parts of a lubricant and 4 parts of a flame retardant in a mixing mechanism;
    Step 2: placing the mixture obtained in step 1 into a heating device, heating the mixture at temperature 110° C.-120° C., cooling the mixture and letting it sit for 24 hours;
    Step 3: obtaining the wiring through by placing the mixture into two twin-screw extruders for extrusion, plasticizing and molding, thereby enhancing the wood feeling of the wiring trough and achieving the multi-color of the wiring trough; cutting the wiring trough to desired length.

4. The method for preparing the wiring trough of claim 3, wherein in step 3, the extrusion temperature of the twin-screw extruder is 150° C.-180° C.

5. The method for preparing the wiring trough of claim 3, wherein in step 1, the flame retardant is a magnesium hydroxide halogen-free flame retardant.

6. The method for preparing the wiring trough of claim 3, wherein in step 1, the lubricant is composed of stearic acid, oxidized polyethylene wax and stearic acid glyceride in a mass ratio of 1:1:2.

7. The method for preparing the wiring trough of claim 3, wherein in step 1, the combined heat stabilizer is formed by mixing calcium stearate, zinc stearate and ultraviolet absorber according to a mass ratio of 1:1:3.

8. The method for preparing the wiring trough of claim 3, wherein in step 1, the anti-impact agent is composed of methyl methacrylate and acrylate in a mass ratio of 1:1.

* * * * *